Nov. 29, 1955  C. A. MEYER  2,724,947
PRESSURE DIFFERENTIAL CONTROL FOR VARIABLE JET NOZZLE
Filed May 23, 1952
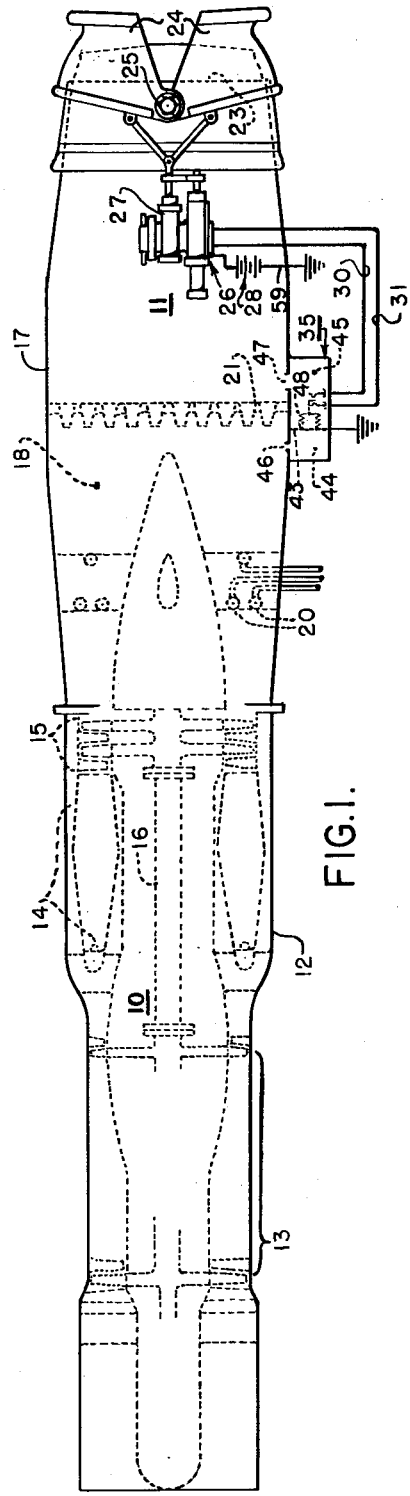
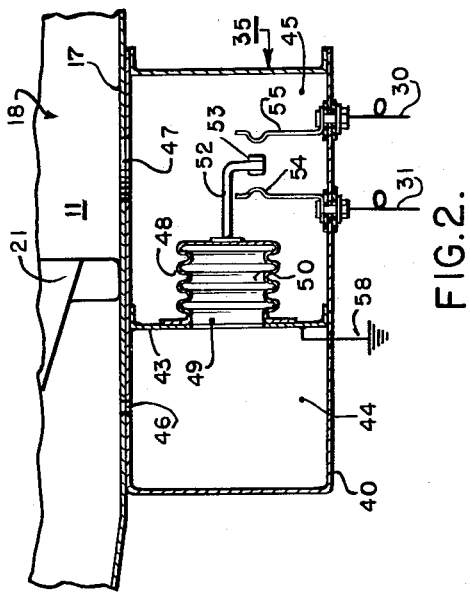
INVENTOR
CHARLES A. MEYER
BY
Ralph T. French
ATTORNEY United States Patent Office 2,724,947
Patented Nov. 29, 1955

2,724,947

PRESSURE DIFFERENTIAL CONTROL FOR VARIABLE JET NOZZLE

Charles A. Meyer, Drexel Hill, Pa., assignor, by mesne assignments, to the United States of America as represented by the Secretary of the Navy Application May 23, 1952, Serial No. 289,528

4 Claims. (Cl. 60—35.6)

This invention relates to power plants, and more particularly to a gas turbine engine or a turbojet power plant of the type equipped with an afterburner and variable area nozzle apparatus.

In controlling the operation of a power plant of this class, the variable area nozzle must be open when the afterburner is lighted or initially is set in operation, to avoid imposition of high back pressures on the gas turbine. When operation of the afterburner ceases, owing to a "light off" or "blow out" condition at high altitude, the nozzle must be closed to reduce the exhaust flow area so that turbine outlet pressure will not fall with a consequent loss in thrust. Suitable means for actuating the elements of a variable area nozzle are well known, and may comprise an hydraulic motor controlled by solenoid valves which are adapted to be selectively energized through the medium of nozzle opening and closing electrical circuits. It has been proposed to provide combustion indicator apparatus serving to initiate selective operation of such an electro-responsive variable area nozzle means, to effect opening or closing of the nozzle of an after-burner in an aviation gas turbine engine in response to changes in operational characteristics, such as the afterburner momentum pressure drop or the scheduled turbine pressure ratio. Combustion indicator apparatus of the construction heretofore proposed has not been entirely satisfactory, however, as it has necessitated provision of unduly complex and expensive equipment.

In order to promote quick and effective operation of a gas turbine power plant equipped with an afterburner and electro-responsive nozzle area controlling apparatus, it is an object of the present invention to provide relatively simple and inexpensive means responsive to an afterburner combustion pressure characteristic for selectively energizing the nozzle opening and closing circuits of the apparatus.

Another object of the invention is the provision of improved afterburner detector switch means responsive to the rate of change of pressure in an afterburner for selectively energizing the nozzle opening and closing circuits of electro-responsive variable area nozzle apparatus.

It is a further object to provide combustion pressure detector means of the foregoing type which may be adapted for controlling a gas turbine power plant of a stationary type.

These and other objects are effected by the invention as will be apparent from the following description taken in connection with the accompanying drawing, forming a part of this application, in which:

Fig. 1 is a longitudinal schematic view of an aviation turbojet power plant equipped with diagrammatically illustrated electro-responsive control apparatus for a variable area nozzle, with which is associated a rate of pressure change switch device constructed in accordance with the invention; and Fig. 2 is an enlarged detail sectional view of the rate of pressure change switch shown in Fig. 1.

A typical turbojet power plant, as shown in Fig. 1, may comprise a gas turbine engine 10 and an afterburner 11. The engine 10 includes casing structure 12 having mounted therein an axial-flow compressor 13, combustion apparatus 14, and a turbine 15, which is operatively connected to the compressor through the medium of a shaft 16. The afterburner 11 comprises cylindrical casing structure 17, the forward end of which is secured to the engine casing structure 12, and which has formed therein an afterburning chamber 18. Suitable fuel supply means (not shown) may be provided for metering liquid fuel to the combustion apparatus 14. Fuel supply nozzles 20 are mounted in the afterburning chamber 18 for feeding liquid fuel thereto, when afterburner operation is desired. A conventional flameholder or grid 21 may be mounted in the afterburning chamber downstream of the fuel nozzles 20.

Formed in the discharge end of the afterburner casing structure 17 is a nozzle 23, the flow area of which can be varied by operation of variable area nozzle means comprising a pair of jointly movable arcuate lid elements 24, which are hinged on pins 25 carried by the casing structure. For the purpose of illustration, diagrammatic electro-responsive nozzle actuating apparatus 26 is provided for operating both lid elements 24, it being understood that this apparatus may be of any suitable construction well known in the art. The nozzle actuating apparatus 26 may, for example, include an hydraulic motor 27 controlled by conventional solenoid valves and holding relays (not shown) which are adapted to be selectively energized from a suitable source of electrical energy 28 through the medium of electrical circuits, such as a nozzle closing circuit 30 and a nozzle opening circuit 31, diagrammatically shown in the drawing. A detailed disclosure of one form of such a nozzle actuating apparatus is found in the copending application of Cyrus F. Wood, Serial No. 121,171, filed October 13, 1949.

According to the invention, an afterburning detector switch device, generally indicated at 35, is provided for controlling energization of the respective nozzle closing circuit 30 and nozzle opening circuit 31, in response to variations in gas pressure in the afterburner. As best shown in Fig. 2, the switch device 35 comprises a casing 40, which is welded or otherwise suitably secured to the casing structure 17 of the afterburner. An interior partition or wall 43 is mounted within the casing structure 40, and divides the interior thereof into chambers 44 and 45. The chamber 44 communicates with the afterburning chamber 18 by way of a restricted opening 46, which is formed in the juxtaposed wall portions of the casing structure 17 and casing 40. A large opening 47, of greater flow area than the restricted opening 46, is formed in the same wall portions for providing communication with the afterburning chamber 18 and the other chamber 45 of the switch device. A movable abutment or flexible diaphragm 48 of the bellows type is mounted on the portion 43, which has an opening 49 forming communication between the interior chamber 50 of the diaphragm and the chamber 44. Thus, the bellows diaphragm is subject to the opposing pressures of fluid in the respective chambers 44 and 45. A contact element 52 is carried on the movable end of the bellows diaphragm and terminates in an end 53 that is interposed between a pair of spaced stationary contact elements 54 and 55 which are carried in chamber 45 by the casing 40. Each of these contact elements is suitably insulated from the casing. The outer end of the contact element 54 is connected to the nozzle opening circuit 31, while the outer end of the contact element 55 is connected to the nozzle closing circuit 30. The movable contact element 52 may be properly grounded, as at 58, or through the medium of the bellows diaphragm and casing members, while one terminal of the electrical energy source 28 may also be grounded, as at 59, to complete either of the circuits 30 or 31 when the contact element 52 is moved into engagement with one or the other of the contact elements 54 and 55. These diagrammatic circuit arrangements do not form part of the present invention, however, and have been chosen for illustrative purposes only, it being understood that any other suitable nozzle control circuits may be substituted for selective energization in accordance with operation of the combustion pressure-responsive switch device 35.

It will now be apparent that, with the turbojet power plant in operation, upon initiation of fuel combustion in the afterburning chamber 18, the gas pressure therein is suddenly increased. Transmittal of this increase in gas pressure to the chamber 45 is rapid, owing to the large flow area of the opening 47, while the rise in gas pressure in the chamber 44 is retarded by reason of the relatively small flow area of the restricted opening 46. Owing to this transitory pressure differential, the bellows diaphragm 48 is consequently partially collapsed toward the left, as viewed in the drawing, bringing the contact element 52 into contact with the contact element 54 for closing the nozzle opening circuit 31. Energization of this circuit causes the nozzle actuating apparatus 26 to effect operation of the lid elements 24 to increase the flow area of the nozzle 23, thereby preventing the development of high back pressures on the gas turbine component.

On the other hand, if the afterburner should "blow out" at altitude, extinction of the flame in the afterburning chamber 18 causes a sudden drop in gas pressure, which is accompanied by a correspondingly quick reduction in the pressure in the chamber 45. The pressure of gases still bottled up in the chamber 44, owing to the restricted passage 46, then expands the bellows diaphragm 48 to carry the contact element 52 into engagement with the contact element 55, thereby effecting energization of the nozzle closing circuit 30 for causing operation of the lid elements 24 to reduce the nozzle flow area for maintaining a desirable thrust value.

From the foregoing it will thus be seen that by interposing the improved afterburning detector switch embodying the invention in a conventional nozzle controlling circuit of a type heretofore employed, automatic control of operation of the variable area nozzle will be maintained efficiently in quick response to accurate indications of the state of combustion in the afterburner.

While the invention has been shown in but one form, it will be obvious to those skilled in the art that it is not so limited, but is susceptible of various changes and modifications without departing from the spirit thereof.

What is claimed is:

1. Combustion apparatus comprising an axial-flow combustion chamber having a discharge nozzle, movable nozzle elements mounted adjacent said nozzle and operative to increase or decrease the flow area thereof, electro-responsive nozzle controlling apparatus operatively connected to said nozzle elements and including a first circuit adapted to be energized for effecting closing movement of said nozzle elements and a second circuit adapted to be energized for effecting opening movement thereof, switch means connected to said circuits and including a movable contact element movable in one direction to close said first circuit and in another direction to close said second circuit, a casing having a pair of separate chambers, a restricted passage connecting one of said chambers to said combustion chamber, a relatively large passage connecting the other of said chambers to said combustion chamber, and a movable abutment interposed between said chambers and operatively connected to said movable contact element, whereby a sudden increase in combustion chamber pressure incident to initiation of combustion effects a pressure differential causing operation of said movable abutment and contact element to close said second circuit, and a sudden reduction in combustion chamber pressure incident to a blow-out condition effects operation of said movable abutment and contact element to close said first circuit.

2. In a jet power plant including a variable area jet nozzle and an afterburner adapted for intermittent operation to augment the thrust at the nozzle, the combination of electro-responsive nozzle actuating apparatus including a nozzle closing circuit and a nozzle opening circuit, selector switch means interposed in said circuits and operative in different directions for closing one or the other of said circuits, and means for actuating said switch means in response to sudden variations in pressure of gases in said afterburner incident to ignition or extinction of a flame therein, comprising a first chamber communicating with said afterburner through a restricted passage, a second chamber communicating with said afterburner through a larger passage, and a movable abutment interposed between said chambers and operatively connected to said switch means.

3. In a jet power plant including a variable area jet nozzle and an afterburner adapted for intermittent operation to augment the thrust at the nozzle, the combination of electro-responsive nozzle actuating apparatus including a nozzle closing circuit and a nozzle opening circuit, selector switch means interposed in said circuits and comprising a first stationary contact element connected to said nozzle closing circuit, a second stationary contact element connected to said nozzle opening circuit and a movable contact element operatively aligned with said first and second stationary contact elements for engagement with either, a casing forming a pair of chambers, a restricted passage connecting one of said chambers to said afterburner, a relatively large passage connecting the other of said chambers to said afterburner, a partition in said casing separating said chambers, and a movable abutment mounted in said partition and carrying said movable contact element, said movable abutment being subject to transitory differentials in pressure of gases set up in said chamber incident to ignition or extinction of a flame in said afterburner.

4. Combustion apparatus for a gas turbine power plant comprising a combustion chamber, a selectively positionable control element serving in a first position to facilitate power plant control when said combustion chamber is operated at high pressure and to a second position to facilitate power plant control when the combustion chamber pressure is low, electro-responsive means operatively connected to said control element and including a first circuit adapted to be energized for effecting movement of said control element to said first position, a second circuit adapted to be energized for effecting movement of said control element to said second position, switch means connected to said circuits and including a movable contact member operative in one direction to close said first circuit and in another direction to close said second circuit, a casing having a pair of separate chambers, a restricted passage connecting one of said chambers to said combustion chamber, a relatively large passage connecting the other of said chambers to said combustion chamber, and a movable abutment interposed between said chambers and operatively connected to said movable switch contact member.

References Cited in the file of this patent

UNITED STATES PATENTS

| | | |
|---|---|---|
| 2,566,961 | Poole | Sept. 4, 1951 |
| 2,619,794 | Lombard | Dec. 2, 1952 |
| 2,623,352 | Sédille et al. | Dec. 30, 1952 |